(12) United States Patent
Yang et al.

(10) Patent No.: US 10,075,279 B2
(45) Date of Patent: Sep. 11, 2018

(54) METHOD FOR DEACTIVATING SECONDARY CELLS BY A BASE STATION AND DEVICE THEREFOR

(71) Applicant: LG ELECTRONICS INC., Seoul (KR)

(72) Inventors: Suckchel Yang, Seoul (KR); Joonkui Ahn, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/039,375

(22) PCT Filed: Nov. 25, 2014

(86) PCT No.: PCT/KR2014/011361
§ 371 (c)(1),
(2) Date: May 25, 2016

(87) PCT Pub. No.: WO2015/076639
PCT Pub. Date: May 28, 2015

(65) Prior Publication Data
US 2017/0170941 A1    Jun. 15, 2017

Related U.S. Application Data

(60) Provisional application No. 61/908,723, filed on Nov. 25, 2013, provisional application No. 61/979,493, filed on Apr. 14, 2014.

(51) Int. Cl.
*H04L 5/00*     (2006.01)
*H04W 72/04*   (2009.01)
(Continued)

(52) U.S. Cl.
CPC .......... *H04L 5/0098* (2013.01); *H04L 1/1812* (2013.01); *H04L 1/1874* (2013.01); *H04W 24/10* (2013.01); *H04W 72/0413* (2013.01)

(58) Field of Classification Search
CPC ... H04L 1/1812; H04L 1/1874; H04L 5/0098; H04W 24/10; H04W 72/0413
(Continued)

(56) References Cited

U.S. PATENT DOCUMENTS

| 8,514,820 B2* | 8/2013 | Cai | H04L 1/0028 370/328 |
| 9,888,522 B2* | 2/2018 | Pani | H04W 76/064 |

(Continued)

FOREIGN PATENT DOCUMENTS

| WO | 2013/025152 A1 | 2/2013 |
| WO | 2013/136173 A1 | 9/2013 |

OTHER PUBLICATIONS

International Search Report and Written Opinion issued in International Application No. PCT/KR2014/011361, dated Mar. 18, 2015, 19 pages.

*Primary Examiner* — Stephen J Clawson
(74) *Attorney, Agent, or Firm* — Lee Hong Degerman Kang & Waimey

(57) ABSTRACT

A method and device for deactivating secondary cells by a base station in a wireless communication system, the method including generating, by the BS, a MAC deactivation message for a first SCell, wherein the first SCell is associated with one or more SCells served by the BS; and transmitting, by the BS, the MAC deactivation message to a UE for deactivating the first Cell, wherein the first SCell is used for transmission of PUCCH including uplink control information for multiplexing all uplink control information of the one or more SCells associated with the first Cell, (Continued)

wherein the MAC deactivation message for the first SCell indicates all of the one or more SCells associated with the first SCell are deactivated.

4 Claims, 10 Drawing Sheets

(51) Int. Cl.
*H04L 1/18* (2006.01)
*H04W 24/10* (2009.01)
(58) Field of Classification Search
USPC .......................................................... 370/216
See application file for complete search history.

(56) References Cited

U.S. PATENT DOCUMENTS

| | | | |
|---|---|---|---|
| 2010/0118723 A1* | 5/2010 | Pani | H04L 1/1812 370/252 |
| 2011/0243066 A1* | 10/2011 | Nayeb Nazar | H04L 1/007 370/328 |
| 2012/0082107 A1 | 4/2012 | Ou et al. | |
| 2012/0281548 A1 | 11/2012 | Lin et al. | |
| 2013/0259003 A1 | 10/2013 | Kwon et al. | |
| 2015/0215926 A1* | 7/2015 | Huang | H04W 36/0061 370/329 |

* cited by examiner

METHOD FOR DEACTIVATING SECONDARY CELLS BY A BASE STATION AND DEVICE THEREFOR

CROSS-REFERENCE TO RELATED APPLICATIONS

This application is the National Stage filing under 35 U.S.C. 371 of International Application No. PCT/KR2014/011361, filed on Nov. 25, 2014, which claims the benefit of U.S. Provisional Application No. 61/908,723, filed on Nov. 25, 2013 and 61/979,493, filed on Apr. 14, 2014, the contents of which are all hereby incorporated by reference herein in their entirety.

TECHNICAL FIELD

The present invention relates to a wireless communication system, and more particularly, to a method for sending a report to a base station by a user equipment and a device therefor.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DETAILED DESCRIPTION OF THE INVENTION

An object of the present invention is to provide a method for sensing a report to a base station by a user equipment more efficiently in a wireless communication system. More specifically, an object of the present invention is to provide a method for efficiently transmitting and receiving control information by a user equipment through dual connectivity (DC) where the user equipment is simultaneously connected to two base stations.

It will be appreciated by persons skilled in the art that the objects that could be achieved with the present invention are not limited to what has been particularly described hereinabove and the above and other objects that the present invention could achieve will be more clearly understood from the following detailed description.

TECHNICAL SOLUTION

In one aspect of the present invention, a method for reporting a radio link failure by a user equipment (UE) in a wireless communication system comprises the steps of establishing a radio resource control (RRC) connection with a first base station and transceiving data from a second base station; monitoring a radio link for a specific secondary cell (Scell), the specific Scell belonging to the second base station; and if the radio link failure for the specific Scell is detected, reporting the radio link failure of the Scell to the first base station.

In another embodiment of the present invention, a user equipment for reporting a radio link failure in a dual connectivity-based wireless communication system comprises a radio frequency (RF) module; and a processor controlling the RF module, wherein the processor establishes a radio resource control (RRC) connection with a first base station, transceives data from a second base station, monitors a radio link for a specific secondary cell (Scell), the specific Scell belonging to the second base station, and if the radio link failure for the specific Scell is detected, reports the radio link failure of the Scell to the first base station.

Preferably, the specific SCell is always activated.

Preferably, the specific SCell is a cell where PUCCH (Physical Uplink Control Channel) transmission is configured.

Preferably, the specific SCell is a cell where a contention random access procedure is performed.

Preferably, the method further comprises the step of receiving an indicator indicating which one of a plurality of SCells included in the second base station is the specific SCell, from any one of the first base station and the second base station.

Preferably, the method further comprises the step of applying a deactivation state to all SCells of a cell group, in which the specific SCell is included, if a radio link failure for the specific SCell is detected.

BRIEF DESCRIPTION OF THE DRAWINGS

The accompanying drawings, which are included to provide a further understanding of the invention, illustrate embodiments of the invention and together with the description serve to explain the principle of the invention. In the drawings.

BEST MODE FOR CARRYING OUT THE INVENTION

The following technologies can be applied to a variety of radio access systems, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied with wireless (or radio) technology such as UTRA (Universal Terrestrial Radio Access) or CDMA2000. TDMA may be embodied with wireless (or radio) technology such as GSM (Global System for Mobile communications)/GPRS (General Packet Radio Service)/EDGE (Enhanced Data Rates for GSM Evolution). OFDMA may be embodied with wireless technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of the UMTS (Universal Mobile Telecommunications System). 3GPP (3rd Generation Partnership Project) LTE (long term evolution) is a part of the E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE.

Although the following embodiments focus on the 3GPP LTE/LTE-A system for clarity of description, the technical features of the present invention are not limited thereto. It should be noted that specific terms disclosed in the present invention are proposed for the convenience of description and better understanding of the present invention, and the use of these specific terms may be changed to another format within the technical scope or spirit of the present invention.

First, the terms used in the present specification will be described.

Figure 1:
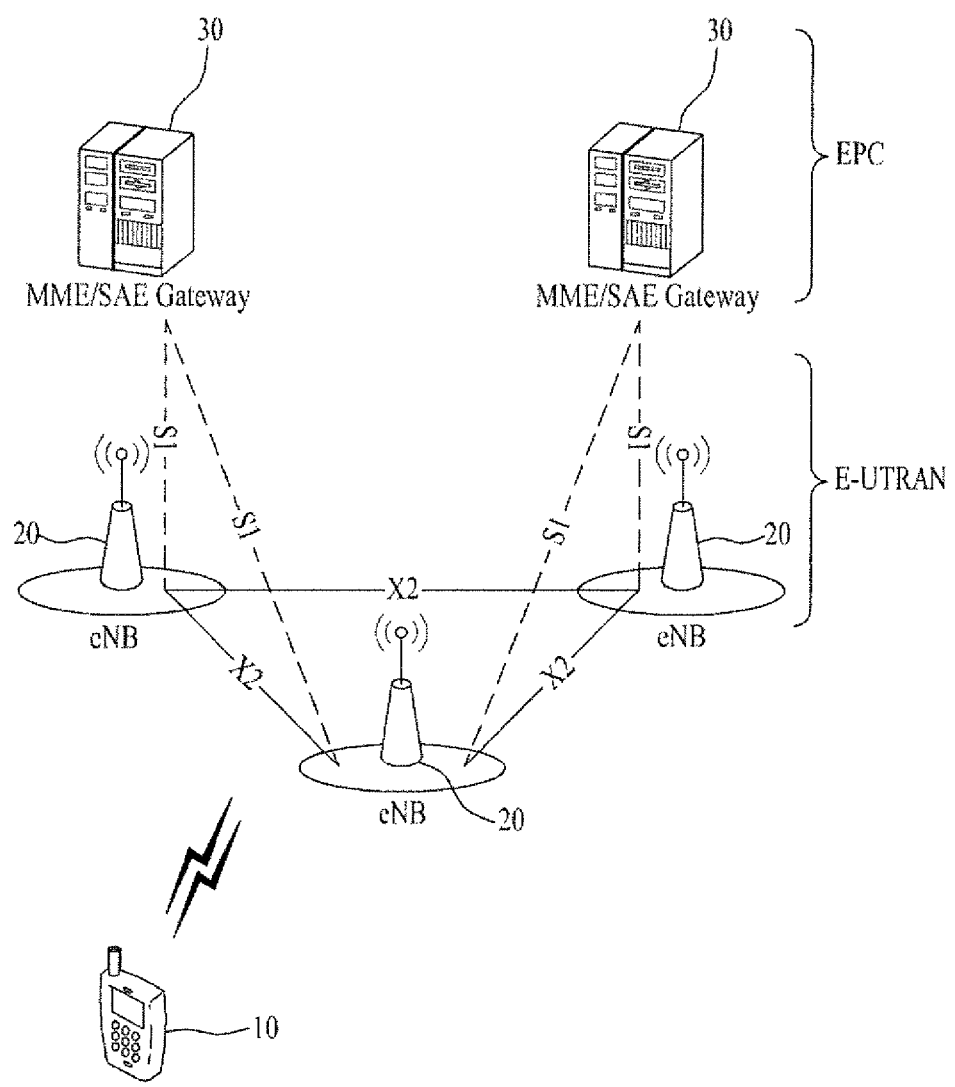
FIG. 1 is a diagram showing a network structure of an evolved universal mobile telecommunication system (E-UMTS)

FIG. 1 is a diagram showing a network structure of an E-UMTS. The E-UMTS is also called a Long Term Evolution (LTE) system. Communication networks are widely arranged to provide a variety of communication services such as voice and packet data.

Referring to FIG. 1, an E-UMTS network mainly includes an Evolved Universal Terrestrial Radio Access Network (E-UTRAN), an Evolved Packet Core (EPC) and one or more user equipments (UEs). The E-UTRAN includes one or more base stations (eNBs) 20 and one or more UEs 10 may be located in one cell. A mobility management entity/system architecture evolution (MME/SAE) gateway 30 is located at an end of a network and is connected to an external network. Downlink refers to communication from the eNB 20 to the UE 10 and uplink refers to communication from the UE to the eNB.

The UE 10 is a communication device held by a user and is also referred to as a mobile station (MS), a user terminal (UT), a subscriber station (SS) or a wireless device. The eNB 20 is generally a fixed station communicating with the UE 10 and is also referred to as an access point (AP). The eNB 20 provides an endpoint of a user plane and a control plane to the UE 10. One eNB 20 may be located in each cell. An interface for transmitting user traffic or control traffic may be used between the eNBs 20. The MME/SAE gateway 30 provides an endpoint of a session and mobility management function to the UE 10. The eNB 20 and the MME/SAE gateway 30 may be connected through an S1 interface.

MME provides various functions such as distribution of a paging message to the eNBs 20, security control, idle state mobility control, SAE bearer control and encryption and integrity protection of non access stratum (NAS) signaling. The SAE gateway host provides various functions including user plane switching for plane packet completion and mobility support of the UE 10. The MME/SAE gateway 30 is briefly referred to as a gateway in the present specification. However, the MME/SAE gateway 30 includes both the MME gateway and the SAE gateway.

A plurality of nodes may be connected between the eNB 20 and the gateway 30 through an S1 interface. The eNBs 20 may be connected to each other through an X2 interface and neighboring eNBs may have a mesh network structure employing the X2 interface.

Figure 2:
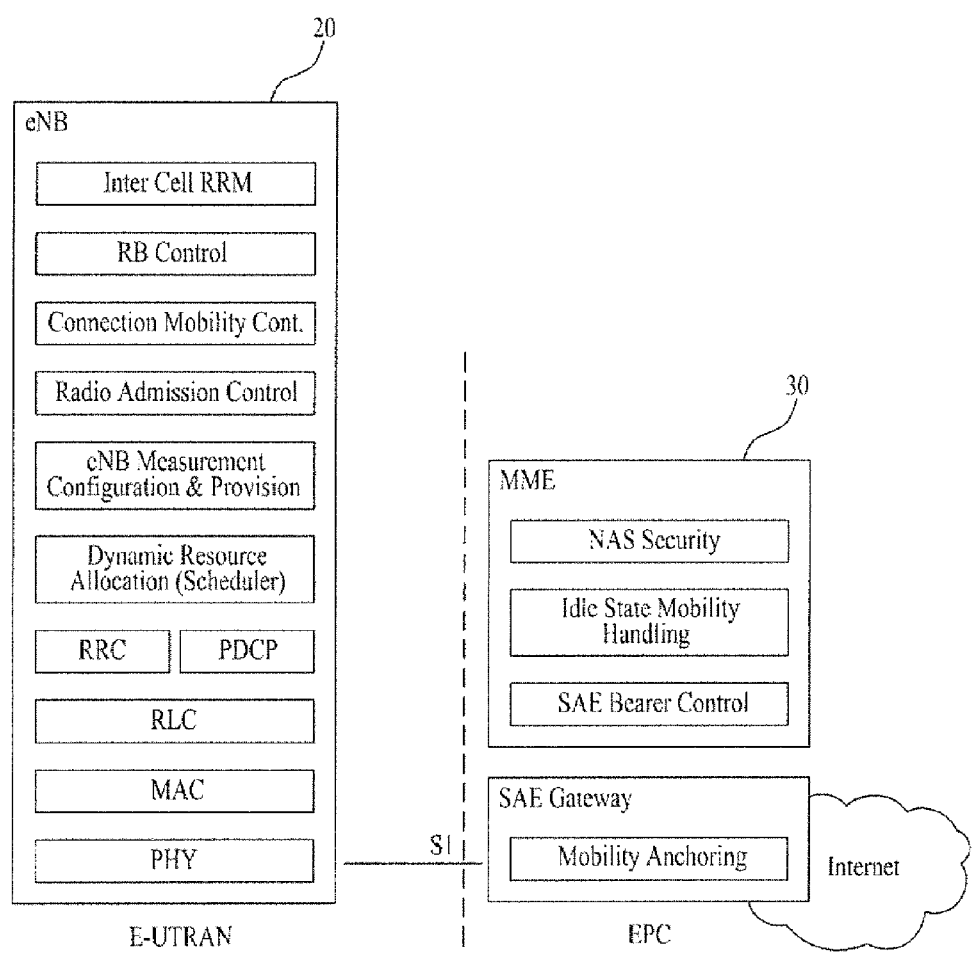
FIG. 2 is a diagram showing the structure of an evolved universal terrestrial radio access network (E-UTRAN) and a gateway.

FIG. 2 is a diagram showing the structures of a general E-UTRAN and a general gateway 30. Referring to FIG. 2, the eNB 20 may perform functions such as selection for the gateway 30, routing to the gateway during radio resource control (RRC) activation, scheduling and transmission of a paging message, scheduling and transmission of broadcast channel (BCCH), dynamic resource allocation for UEs 10 in uplink/downlink, configuration and preparation of eNB measurement, radio bearer control, radio admission control (RAC) and connection mobility control in an LTE-ACTIVE state. The gateway 30 may perform functions such as paging transmission, LTE_IDLE state management, user plane encryption, system architecture evolution (SAE) bearer control and encryption and integrity protection of non access stratum (NAS) signaling.

Figure 3A:
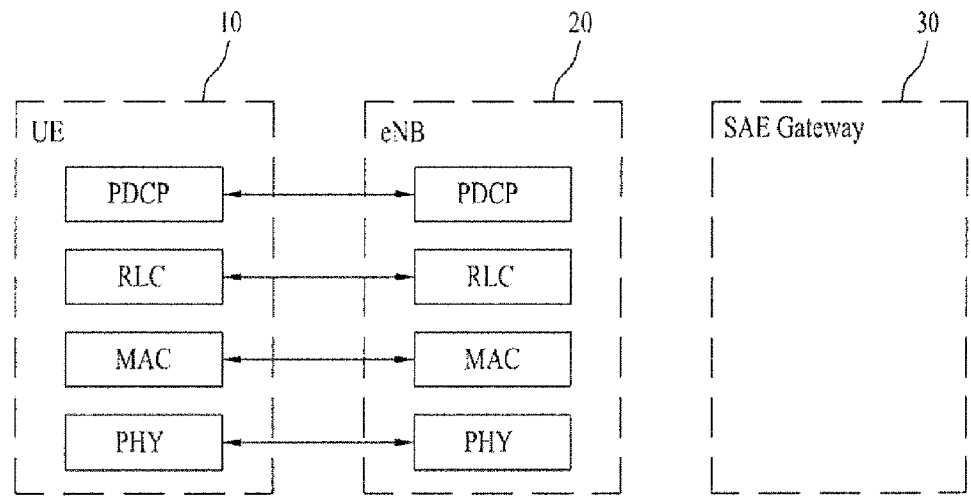
FIGS. 3A to 3B are diagrams showing a user/control plane protocol.
Figure 3B:
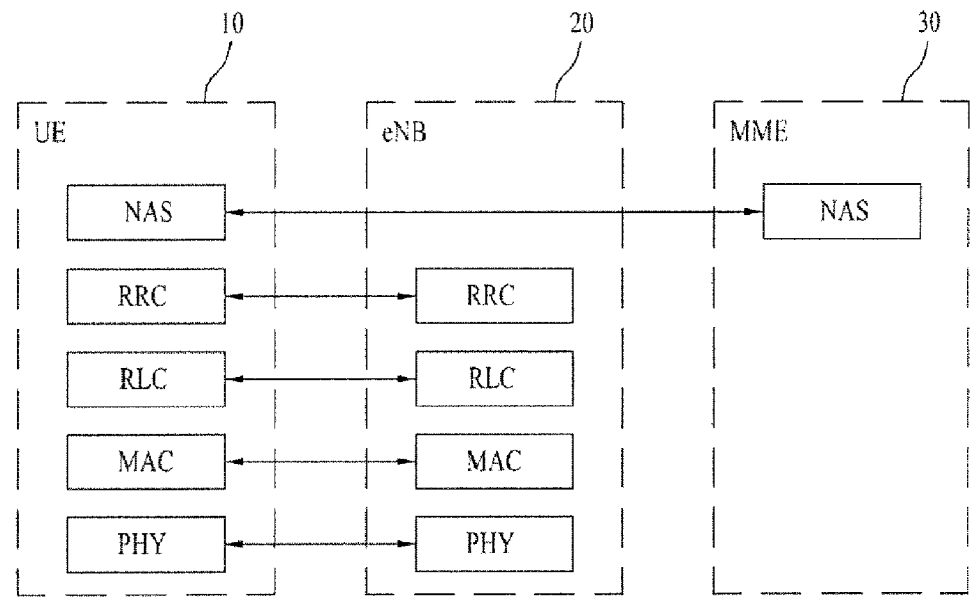

FIGS. 3A to 3B are diagrams showing a user-plane protocol and control-plane protocol stack for an E-UMTS. Referring to FIGS. 3A to 3B, protocol layers may be divided into a first layer (L1), a second layer (L2) and a third layer (L3) based on a lower three layers of an open system interconnection (OSI) standard model known in a technical field of a communication system.

A physical (PHY) layer of a first layer (L1) provides an information transfer service to a higher layer using a physical channel. The PHY layer is connected to a Medium Access Control (MAC) layer located on a higher layer via a transport channel. Data is transported between the MAC layer and the PHY layer via the transport channel. Data is also transported between a physical layer of a transmitting side and a physical layer of a receiving side via a physical channel.

A Medium Access Control (MAC) layer of a second layer (L2) provides a service to a Radio Link Control (RLC) layer of a higher layer via a logical channel. The RLC layer of the second layer (L2) supports reliable data transmission. If the MAC layer performs an RLC function, the RLC layer may be included as a functional block of the MAC layer. A Packet Data Convergence Protocol (PDCP) layer of the second layer (L2) performs a header compression function. The header compression function enables efficient transmission of an Internet Protocol (IP) packet such as an IPv4 packet or an IPv6 packet in a radio interface having a relatively small bandwidth.

A Radio Resource Control (RRC) layer located at the bottom of a third layer (L3) is defined only on the control plane and is responsible for control of logical, transport, and physical channels in association with configuration, re-configuration, and release of Radio Bearers (RBs). The RB means a service provided by the second layer (L2) for data communication between the UE and the E-UTRAN.

Referring to FIG. 3A, the RLC and MAC layers end at the eNB 20 and may perform functions scheduling automatic repeat request (ARQ) and hybrid automatic repeat request (HARQ). The PDCP layer ends at the eNB 20 and may perform functions such as header compression, integrity protection and encryption.

Referring to FIG. 3B, the RLC and MAC layers end at the eNB 20 and perform the same functions as the control plane. As shown in FIG. 3a, the RRC layer ends at the eNB 20 and may perform functions such as broadcasting, paging, RRC connection management, radio bearer (RB) control, mobility function and UE measurement report and control. The NAS control protocol ends at the MME of the gateway 30 and may perform functions such as SAE bearer management, authentication, LTE-IDLE mobility handling, paging transmission in an LTE_IDLE state and security control for signaling between the gateway and the UE 10.

The NAS control protocol may use three states. An LTE-DETACHED state is used when there is no RRC entity. An LTE_IDLE state is used when there is no RRC connection while storing minimum UE 10 information. An LTE_ACTIVE state is used when an RRC state is configured. The RRC state is subdivided into an RRC_IDLE state and an RRC_CONNECTED state.

In the RRC_IDLE state, the UE 10 performs discontinuous reception (DRX) configured by NAS using a uniquely allocated ID in a tracking region. That is, the UE 10 may monitor a paging signal at a specific paging occasion per UE-specific paging DRX cycle to receive broadcast of system information and paging information. In the RRC_IDLE state, the eNB does not store any RRC context.

In the RRC_CONNECTED state, the UE 10 may transmit and/or receive data to/from the eNB using context in the E-UTRAN and E-UTRAN RRC connection. In addition, the UE may report channel quality information and feedback information to the eNB. In the RRC_CONNECTED state, the E-UTRAN knows a cell, to which the UE 10 belongs. Accordingly, the network may transmit and/or receive data to/from the UE 10, control mobility such as UE handover and perform cell measurement of peripheral cells.

Figure 4:
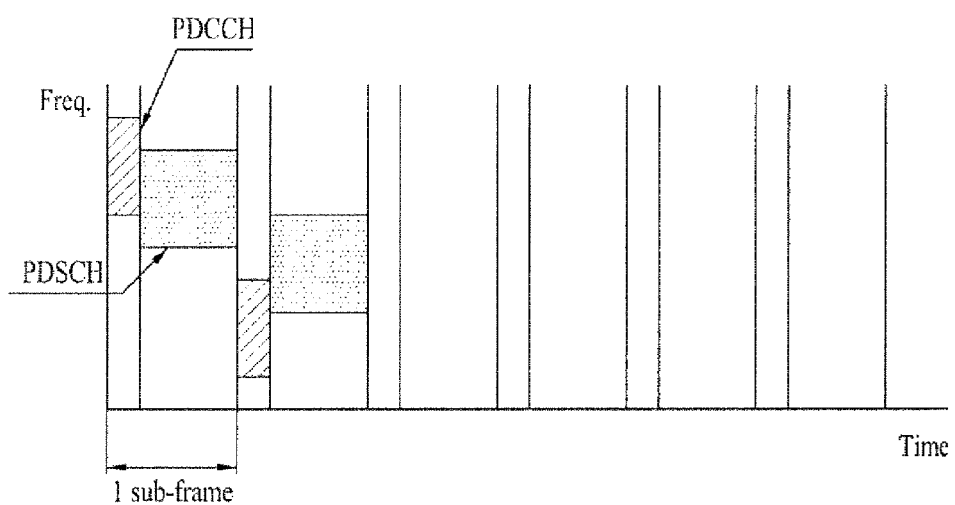
FIG. 4 is a diagram showing the structure of a radio frame.

FIG. 4 is a diagram showing the structure of a radio frame.

Referring to FIG. 4, the E-UMTS system uses a radio frame of 10 ms and one radio frame includes 10 subframes. In addition, one subframe includes two consecutive slots. The length of one slot may be 0.5 ms. One subframe includes a plurality of symbols (e.g., OFDM symbols, SC-FDM symbols). One subframe includes a plurality of resource blocks and one resource block includes a plurality of symbols and a plurality of subcarriers. In downlink, some (e.g., first symbol) of the plurality of symbols configuring the subframe may be used to transmit L1/L2 control information.

More specifically, a maximum of three (four) OFDM symbols of a front portion of a first slot within a subframe corresponds to a control region to which a downlink control channel is allocated for L1/L2 control information transmission. The remaining OFDM symbols correspond to a data region to which a Physical Downlink Shared Channel (PDSCH) is allocated. Examples of the downlink control channels include, for example, a Physical Control Format Indicator Channel (PCFICH), a Physical Downlink Control Channel (PDCCH), a Physical Hybrid automatic repeat request Indicator Channel (PHICH), etc. The PCFICH is transmitted at a first OFDM symbol of a subframe, and carries information about the number of OFDM symbols used to transmit the control channel within the subframe. The PHICH carries a HARQ ACK/NACK signal in response to uplink transmission.

The control information transmitted through the PDCCH is referred to as Downlink Control Information (DCI). In the DCI format, formats 0, 3, 3A and 4 are defined for uplink and formats 1, 1A, 1B, 1C, 1D, 2, 2A, 2B and 2C are defined for downlink. The DCI format selectively includes hopping flag, RB allocation, modulation coding scheme (MCS), redundancy version (RV), new data indicator (NDI), transmit power control (TPC), cyclic shift demodulation reference signal (DM RS), channel quality information (CQI) request, HARQ process number, transmitted precoding matrix indicator (TPMI), precoding matrix indicator (PMI), etc.

The PDCCH may carry transmission format and resource allocation information of a Downlink Shared Channel (DL-SCH), transmission format and resource allocation information of an Uplink Shared Channel (UL-SCH), paging information on a Paging Channel (PCH), system information on the DL-SCH, resource allocation of a higher layer control message such as a Random Access Response (RAR) transmitted on the PDSCH, a set of transmit (Tx) power control commands for individual UEs within a UE group, a Tx power control command, information indicating activation of Voice over IP (VoIP), etc. A plurality of PDCCHs may be transmitted within the control region. The UE may monitor the plurality of PDCCHs. The PDCCHs are transmitted as an aggregate of one or several consecutive control channel elements (CCEs). The CCE is a logical allocation unit used to provide the PDCCHs with a coding rate based on the state of a radio channel. The CCE corresponds to a plurality of resource element groups (REGs). The format of the PDCCH and the number of PDCCH bits are determined based on the number of CCEs. The BS determines a PDCCH format according to a DCI to be transmitted to the UE, and attaches a Cyclic Redundancy Check (CRC) to control information. The CRC is masked with a Radio Network Temporary Identifier (RNTI) according to an owner or usage of the PDCCH. If the PDCCH is for a specific UE, a cell-RNTI (C-RNTI) of the UE may be masked to the CRC. Alternatively, if the PDCCH is for a paging message, a paging indicator identifier (P-RNTI) may be masked to the CRC. If the PDCCH is for system information (more specifically, a system information block (SIB)), a system information RNTI (SI-RNTI) may be masked to the CRC. If the PDCCH is for random access response, a random access-RNTI (RA-RNTI) may be masked to the CRC.

Figure 5:
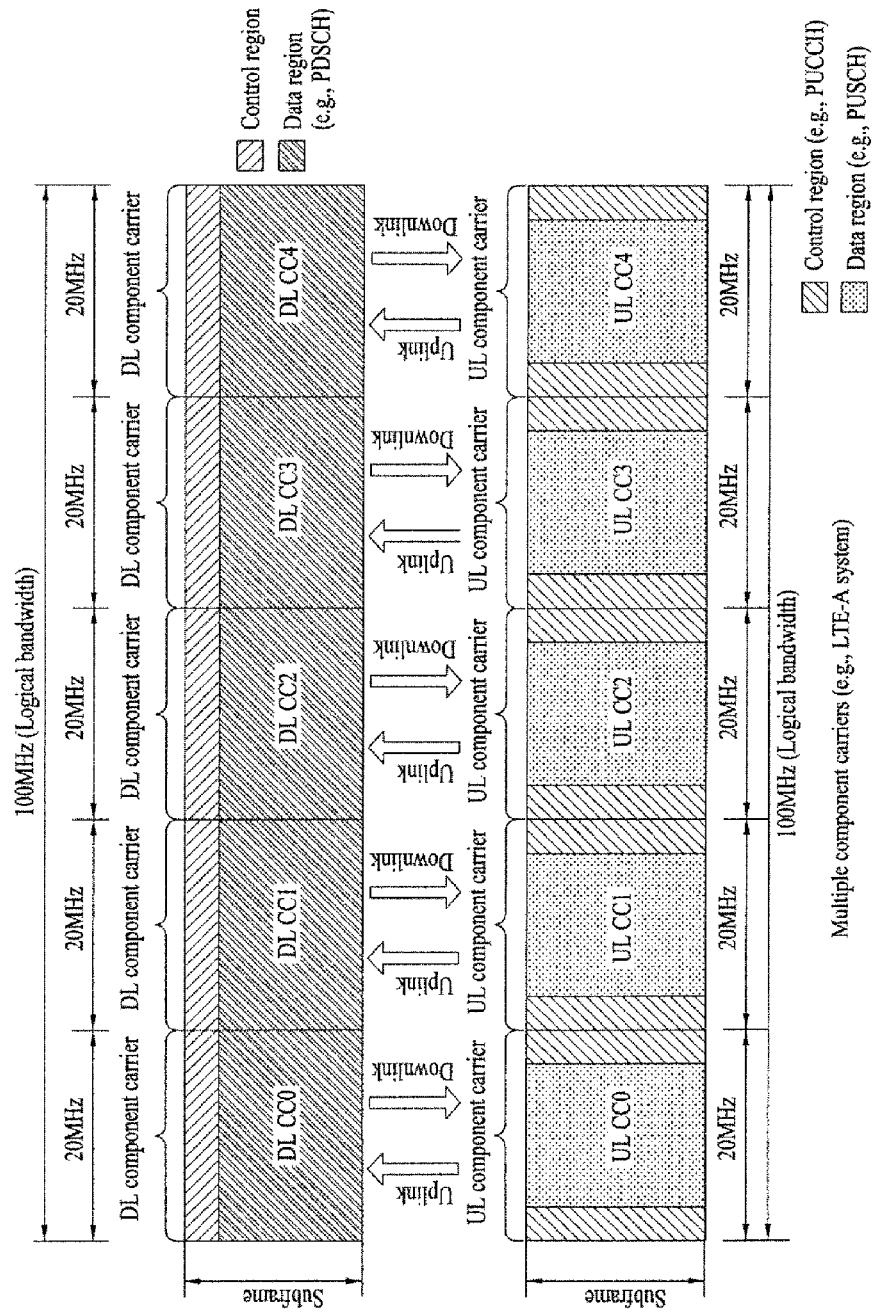
FIG. 5 illustrates a carrier aggregation (CA) communication system.

FIG. 5 is a diagram showing a carrier aggregation (CA) communication system. An LTE-A system uses carrier aggregation or bandwidth aggregation technology to aggregate a plurality of uplink/downlink frequency blocks to use a larger uplink/downlink bandwidth in order to use a wider frequency bandwidth. Each frequency block is transmitted using a component carrier (CC). The component carrier may be understood as a carrier frequency (or a center carrier or a center frequency) for a frequency block.

Referring to FIG. 5, a plurality of uplink/downlink component carriers (CCs) may be aggregated to support a wider uplink/downlink bandwidth. CCs may or may not be adjacent to each other in the frequency domain. The bandwidth of each CC may be independently configured. Asymmetric carrier aggregation in which the number of UL CCs and the number of DL CCs are different is possible. For example, if the number of DL CCs is 2 and the number of UL CCs is 1, the DL CCs may correspond to the UL CC 2:1. The DL CC/UL CC link may be fixed or semi-static. In addition, although an overall system bandwidth includes N CCs, a frequency bandwidth monitored/received by a specific UE may be restricted to L (<N) CCs. Various carrier aggregation parameters may be configured in a cell-specific, UE group-specific or UE-specific manner. Control information may be configured to be transmitted and received only via a specific CC. Such a specific CC may be referred to as a primary CC (PCC) and the remaining CCs may be referred to as secondary CCs (SCCs).

LTE-A uses the concept of a cell in order to manage radio resources. The cell is defined as a combination of downlink resources and uplink resources, and the uplink resources are not mandatory. Accordingly, the cell may be composed of downlink resources alone or both downlink resources and uplink resources. If carrier aggregation is supported, linkage between a carrier frequency (or a DL CC) of downlink resources and a carrier frequency (or a UL CC) of uplink resources may be indicated by system information. A cell operating on a primary frequency (e.g., a primary CC (PCC)) may be referred to as a PCell and a cell operating on a secondary frequency (e.g., a secondary CC (SCC)) may be referred to as an SCell. The PCell is used for a UE to perform an initial connection establishment procedure or a connection re-establishment procedure. The PCell may indicate a cell indicated in a handover procedure. The SCell may be configured after RRC connection establishment and may be used to provide additional radio resources. The PCell and the SCell may be collectively referred to as a serving cell. In the case of a UE which is in an RRC_CONNECTED state but does not establish or support carrier aggregation, only one serving cell including only the PCell exists. In case of a UE which is in an RRC_CONNECTED state and establishes carrier aggregation, one or more serving cells exist and the serving cells include the PCell and all SCells. For carrier aggregation, a network may be added to the PCell initially configured in a connection establishment procedure and one or more SCells may be configured for a UE supporting carrier aggregation, after an initial security activation procedure is initiated.

If cross-carrier scheduling (or cross-CC scheduling) is applied, a PDCCH for downlink allocation is transmitted on DL CC #0 and a PDSCH corresponding thereto is transmitted on DL CC #2. For cross-CC scheduling, a carrier indicator field (CIF) may be introduced. Presence/absence of a CIF within a PDCCH may be configured by higher layer signaling (e.g., RRC signaling) in a semi-static and UE-specific (or UE group-specific) manner. A baseline of PDCCH transmission will be summarized as follows.

CIF disabled: A PDCCH on a DL CC allocates PDSCH resources on the same DL CC or PUSCH resources on a single linked UL CC.

CIF enabled: A PDCCH on a DL CC may allocate PDSCH or PUSCH resources on a specific DL/UL CC among a plurality of aggregated DL/UL CCs using a CIF.

If the CIF is present, an eNB may allocate a PDCCH monitoring DL CC set in order to reduce BD complexity of a UE. The PDCCH monitoring DL CC set is a part of all aggregated DL CCs and includes one or more DL CCs. A UE performs PDCCH detection/decoding only on the DL CC. That is, if an eNB schedules a PDSCH/PUSCH to a UE, the PDCCH is transmitted only via a PDCCH monitoring DL CC set. The PDCCH monitoring DL CC set may be configured in a UE-specific, UE group-specific or cell-specific manner. The term "PDCCH monitoring DL CC" may be replaced with the term "monitoring carrier" or "monitoring cell". In addition, the term "CCs aggregated for a UE" may be replaced with the term "serving CC", "serving carrier" or "serving cell".

Figure 6:
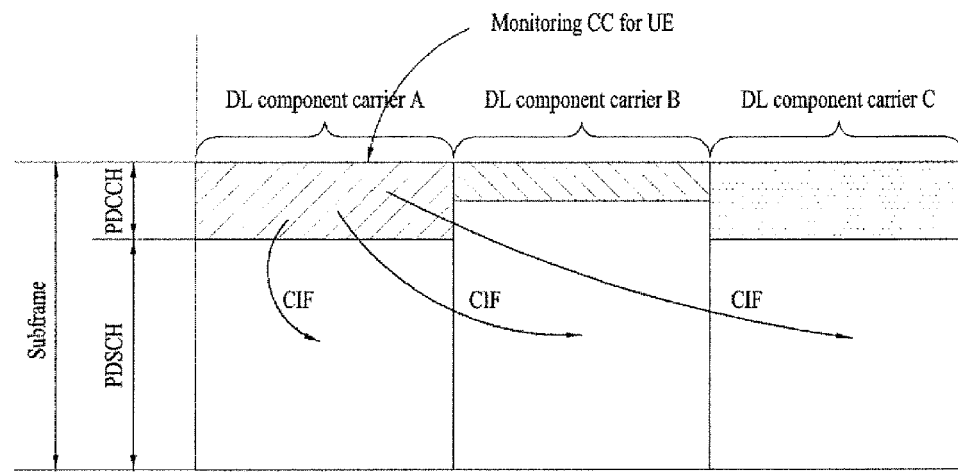
FIG. 6 illustrates scheduling when a plurality of carriers are aggregated.

FIG. 6 shows scheduling if a plurality of carriers is aggregated. Assume that three DL CCs are aggregated. Assume that a DL CC A is configured to a PDCCH monitoring DL CC. DL CCs A to C may be referred to as serving CCs, serving carriers or service cells. If a CIF is disabled, each DL CC may transmit only a PDCCH scheduling a PDSCH thereof without the CIF according to an LTE PDCCH rule. In contrast, if a CIF is enabled by UE-specific (or UE group-specific or cell-specific) higher layer signaling, the DL CC A (monitoring DL CC) may transmit not only a PDCCH scheduling a PDCCH of the DL CC A but also a PDCCH scheduling a PDSCH of another CC, using the CIF. In this case, the PDCCH is not transmitted in the DL CC B/C.

Figure 7:
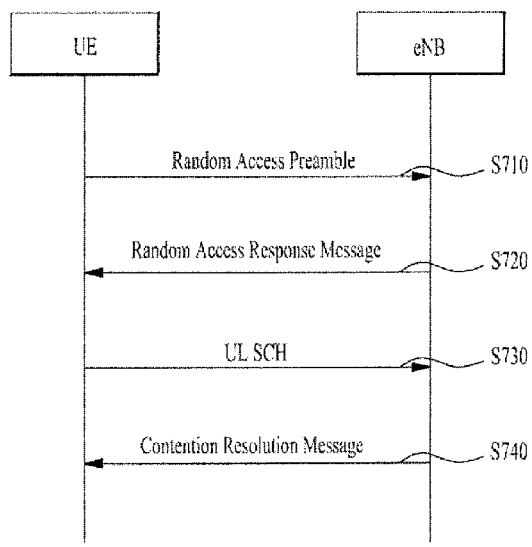
FIG. 7 illustrates a random access procedure.

FIG. 7 illustrates a random access procedure.

Referring to FIG. 7, a UE receives random access information from an eNB via system information. Thereafter, if random access is necessary, the UE transmits a random access preamble (message 1) to the eNB (S710). When the eNB receives the random access preamble from the UE, the eNB transmits a random access response message (RAR) (message 2) to the UE (S720). More specifically, downlink scheduling information of the random access response message may be CRC-masked with a random access RNTI (RA-RNTI) and transmitted on an L1/L2 control channel (PDCCH). A PDCCH masked with the RA-RNTI (hereinafter, RAR-PDCCH) is transmitted in a common search space. The UE, which has received a downlink scheduling signal masked with the RA-RNTI, may receive the random access response message from a scheduled PDSCH and decode the random access response message. Thereafter, the UE checks whether random access response information signaled thereto is included in the random access response message. Whether the random access response information signaled to the UE is included in the random access response message may be checked by determining whether a random access preamble ID (RAID) for the preamble transmitted by the UE is present. The random access response information includes timing advance (TA) indicating timing offset information for synchronization, radio resource allocation information used for uplink, a temporary identifier for UE identification (e.g., temporary C-RNTI, TC-RNTI). When the UE receives the random access response information, an uplink message (message 3) is transmitted via an uplink shared channel (SCH) in accordance with the radio resource allocation information included in the response information (S730). The eNB receives the uplink message from the UE and then transmits a contention resolution message (message 4) to the UE (S740).

Figure 8:
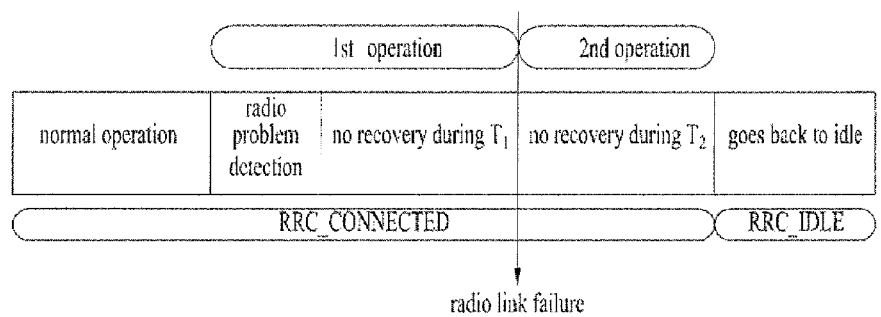
FIG. 8 illustrates a flow chart of a method for detecting a radio link failure (RLF)

FIG. 8 illustrates a flow chart of a method for detecting a radio link failure (RLF).

In a carrier aggregation system that includes a plurality of serving cells, the UE performs radio link monitoring (RLM) for the serving cells.

In case of RLM, the UE may monitor downlink radio link quality of a serving cell (e.g., primary cell, Pcell) on the basis of a CRS. In more detail, the UE may estimate radio link quality at a single subframe on the basis of the CRS, and may monitor/assess a radio link status (e.g., out-of-sync or in-sync) by comparing the estimated value (e.g., SNR (Signal to Noise Ratio) or SINR (Signal to Interference and Noise Ratio) with threshold values Qout and Qin. If the radio link status corresponds to in-sync, the UE may normally perform/maintain communication with the eNB, and if the radio link status corresponds to out-of-sync, the UE may regard that radio link has failed and perform an operation such as RRC connection re-establishment, handover, cell reselection and cell measurement. The threshold value Qout is defined as a level that a downlink radio link cannot be received reliably, and corresponds to BLER (Block Error Rate) 10% of hypothetical PDCCH transmission when a PCFICH error is considered in a state that parameters of Table 1 are assumed. The threshold value Qin is defined as a level that a downlink radio link can be received meaningfully and reliably, and corresponds to PDCCH BLER 2% of hypothetical PDCCH transmission when a PCFICH error is considered in a state that parameters of Table 2 are assumed.

Subframe(s) for which RLM is performed may be restricted through higher layer (e.g., RRC) signaling.

Table 1 illustrates PDCCH/PCFICH transmission parameters of out-of-sync, and Table 2 illustrates PDCCH/PCFICH transmission parameters of in-sync.

TABLE 1

| Attribute | Value |
| --- | --- |
| DCI format | 1A |
| Number of control OFDM symbols | 2; Bandwidth ≥ 10 MHz<br>3; 3 MHz ≤ Bandwidth ≤ 10 MHz<br>4; Bandwidth = 1.4 MHz |
| Aggregation level (CCE) | 4; Bandwidth = 1.4 MHz<br>8; Bandwidth ≥ 3 MHz |
| Ratio of PDCCH RE energy to average RS RE energy | 4 dB; when single antenna port is used for cell-specific reference signal transmission by the PCell.<br>1 dB: when two or four antenna ports are used for cell-specific reference signal transmission by the PCell. |
| Ratio of PCFICH RE energy to average RS RE energy | 4 dB; when single antenna port is used for cell-specific reference signal transmission by the PCell.<br>1 dB: when two or four antenna ports are used for cell-specific reference signal transmission by the PCell. |

Note 1:
DCI format 1A is defined in clause 5.3.3.1.3 in TS 36.212 [21].
Note 2:
A hypothetical PCFICH transmission corresponding to the number of control symbols shall be assumed.

TABLE 2

| Attribute | Value |
| --- | --- |
| DCI format | 1C |
| Number of control OFDM symbols | 2; Bandwidth ≥ 10 MHz<br>3; 3 MHz ≤ Bandwidth ≤ 10 MHz<br>4; Bandwidth = 1.4 MHz |
| Aggregation level (CCE) | 4 |
| Ratio of PDCCH RE energy to average RS RE energy | 0 dB; when single antenna port is used for cell-specific refence signal transmission by the PCell.<br>−3 dB; when two or four antenna ports are used for cell-specific reference signal transmission by the PCell. |
| Ratio of PCFICH RE energy to average RS RE energy | 4 dB; when single antenna port is used for cell-specific reference signal transmission by the PCell.<br>1 dB: when two or four antenna ports are used for cell-specific reference signal transmission by the PCell. |

Note 1:
DCI format 1C is defined in clause 5.3.3.1.4 in TS 36.212 [21].
Note 2:
A hypothetical PCFICH transmission corresponding to the number of control symbols shall be assumed.

A physical layer of the UE monitors downlink radio link quality of a serving cell (e.g., PCell) and notifies a higher layer (e.g., RRC layer) of out-of-sync/in-sync status. In more detail, if radio link quality is better than Qin, the physical layer of the UE notifies the higher layer of in-sync status at a radio frame where radio link quality is assessed. In a non-DRX mode, the physical layer of the UE assesses radio link quality every radio frame, and in a DRX mode, the physical layer of the UE assesses the radio link quality at least once every DRX cycle. If higher layer signalling indicates subframe(s) for restricted radio link monitoring (RLM), the assessment of the radio link quality is not performed at any other subframe other than those indicated. Afterwards, the physical layer of the UE notifies the higher layer of out-of-sync at the radio frames where the radio link quality is assessed when the radio link quality is worse than the threshold Qout.

When the radio link status indicates in-sync, the UE may normally perform/maintain communication. When the radio link status indicates out-of-sync, the UE regards that radio link failure (RLF) has occurred for the radio link. If radio link failure (RLF) occurs for the PCell, the procedure of the UE is performed by the method of FIG. 8. As shown in FIG. 8, the operation related to radio link failure includes two steps as follows.

The first step starts as a radio link problem is detected. This leads to radio link failure detection. There is no UE-based mobility at the first step, and the first step is based a timer T1.

The second step starts when radio link failure has been detected but handover has failed. This leads to RRC_IDLE state. There is UE-based mobility at the second step, and the second step is based on a timer T2.

At the second step, the UE resumes RRC connection (state), and in order to avoid any change to the RRC_IDLE state, the UE may perform the following procedures when returning to the same cell where radio link failure is found, when one base station selects another cell different from the cell where radio link failure is found, or when another base station selects a cell.

1. The UE maintains RRC_CONNECTED state for a time period of T2.

2. The UE accesses to a cell through a random access procedure.

3. The base station identifies the corresponding UE by using identification information or identification (e.g., C-RNTI of the UE in a cell where RLF occurs, identity of a physical layer of a corresponding cell, short MAC-I based on security key of a corresponding cell, etc.) of the UE, which is used within a contention resolution random access procedure, and identifies whether a stored context belongs to the UE. At this time, the identification information of the UE, which is used within the contention resolution random access procedure, may preferably be information used during random access preamble transmission of the contention resolution random access procedure.

In the aforementioned 3, if the base station finds that the stored context is the same as identity of the corresponding UE, the base station notifies the UE that RRC connection of the UE may restart. Meanwhile, if the base station does not find the context, RRC connection between the UE and the base station is released, and the UE may start a procedure of establishing new RRC connection. In this case, the UE is switched to RRC_IDLE state.

Figure 9:
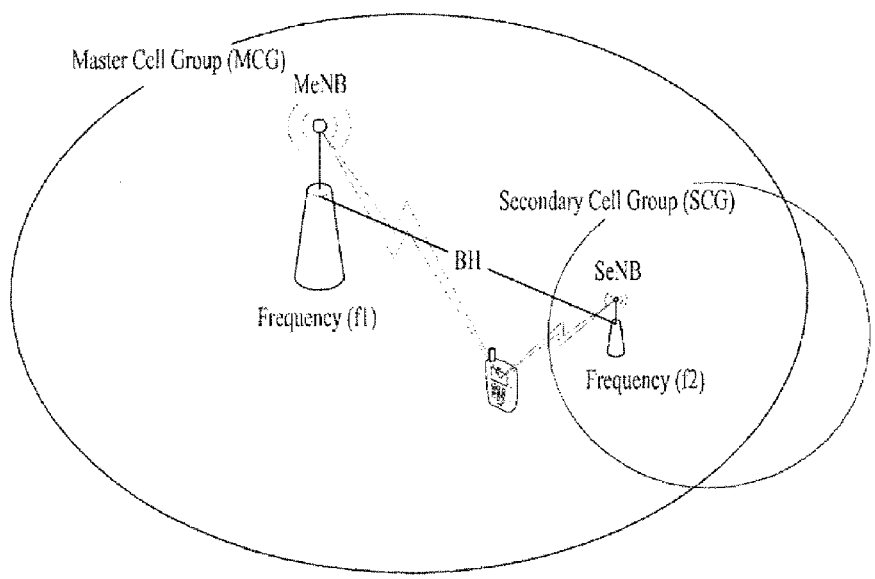
FIG. 9 illustrates dual connectivity.

FIG. 9 illustrates dual connectivity.

In LTE-A, assume that aggregation (that is, CA) of a plurality of cells is supported and a plurality of cells aggregated for one UE is managed by one eNB (intra-site CA). In intra-site CA, since all cells are managed by one eNB, signaling related to various RRC configurations/reports and MAC commands/messages may be performed via any one of all aggregated cells. For example, signaling involved in a procedure of adding or releasing a specific SCell to or from a CA cell set, a procedure of changing a transmission mode (TM) of a specific cell, a procedure of performing radio resource management (RRM) measurement reporting associated with a specific cell, etc. may be performed via any cell of the CA cell set. As another example, signaling involved in a procedure of activating/deactivating a specific SCell, a buffer status report for UL buffer management, etc. may be performed via any cell of the CA cell set. As another example, a per-cell power headroom report (PHR) for UL power control, a per-timing advanced group (TAG) timing advance command (TAC) for UL synchronization control, etc. may be signaled via any cell of the CA cell set.

Meanwhile, in a post-LTE-A system, for traffic optimization, a plurality of cells (e.g., micro cells) of which coverage is small may be deployed within a cell (e.g., macro cell) of which coverage is great. For example, it may be considered that a macro cell and a micro cell may be aggregated for one UE, the macro cell may be used for mobility management (e.g., PCell), and the micro cell may be used for throughput boosting (e.g., SCell). In this case, the cells aggregated for one UE may have their respective coverages different from each other, wherein each cell may be managed by different base stations (or corresponding nodes (e.g., relays) geographically spaced apart from each other (inter-site CA). Inter-site CA has a structure that two base stations are connected to one UE. This will be referred to as dual connectivity (DC).

Referring to FIG. 9, DC has a structure that a master base station MeNB and a secondary base station SeNB are simultaneously connected to one UE. In this case, a master cell group (MCG) means a group of serving cells (comprised of one PCell and at least 0 or one or more SCells) related to a master base station, and a secondary cell group (SCG) means a group of serving cells (comprised of one or more SCells) related to a secondary base station. At this time, in case of the SCG, one of one or more SCells is designated as PSCell, wherein the PSCell is a serving cell included in the SCG, and serves as a function (for example, RLM target) similar to that of PCell included in the MCG. The PSCell may be designated in various manners. Particularly, the PSCell may be designated by RRC signaling. The master base station may be a base station terminated at S1-MME, and the secondary base station may be a base station that provides additional resource for the UE.

In a DC status, the UE maintains a scheduling radio bearer (SRB) in the MCG, and a data radio bearer (DRB) may be offloaded in the SCG to provide high throughput. The MCG is operated by the master base station through frequency f1, and the SCG is operated by the secondary base station through frequency f2. The frequencies f1 and f2 may be the same as each other. A non-ideal interface (e.g., X2 interface) may be used as a backhaul interface between the master base station and the secondary base station. However, since the non-ideal interface is used as the backhaul interface, significant delay may occur, and concentrated scheduling at one base station may not be performed.

Figure 10:
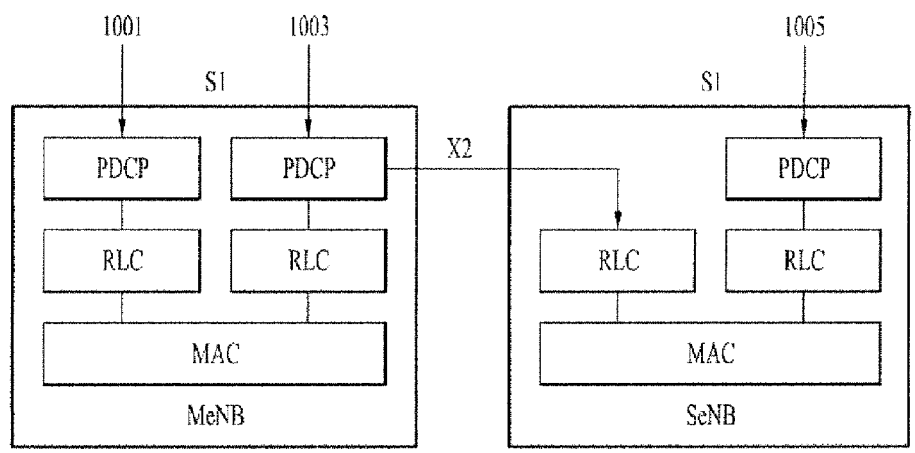
FIG. 10 illustrates a radio protocol structure in dual connectivity (DC)

FIG. 10 illustrates a radio protocol structure in dual connectivity (DC).

Since one UE is connected to two base stations in DC, a discussion as to how a specific radio bearer is configured will be required.

Three structures have been discussed until now. That is, the three structures include an MCG bearer 1001, a split bearer 1003 and an SCG bearer 1005. A signaling radio bearer (SRB) is always included in the MCG, the UE always receives a radio resource through the master base station. The MCG bearer 1101 is always located in the master base station to use resources of the master base station in a DC status. The SCG bearer 1105 is also always located in the secondary base station to use resources of the secondary base station in a DC status.

The split bearer 1103 is a radio protocol where both the master base station and the secondary base station are located. Therefore, the split bearer 1103 may use both the resources of the master base station and the resources of the secondary base station. The split bearer 1103 has one PDCP (Packet Data Convergence Protocol) entity, two RLC (Radio Link Control) entities, and two MAC (Medium Access Control) entities with respect to one direction. Particularly, DC operation has at least one or more radio bearers configured to use radio resources provided by the secondary base station.

In DC, an inter-site CA situation in which a PCell (e.g., CC1) and an SCell (e.g., CC2) aggregated for one UE are respectively managed by eNB-1 and eNB-2 is assumed. In addition, assume that the eNB (that is, eNB-1) for managing the PCell is responsible for managing/performing an RRC function associated with the UE corresponding thereto. At this time, if a radio resource management (RRM) measurement (e.g., reference signal received power (RSRP), reference signal received quality (RSRQ)) report associated with the SCell is not transmitted by the PCell but is transmitted via the SCell (e.g., a PUSCH), eNB-2 may deliver the RRM measurement report to eNB-1 via the BH. In addition, based on the RRM report, for example, if eNB-1 sends an RRC reconfiguration command for releasing the SCell from the CA cell set to the UE via the PCell (e.g., a PDSCH), the UE may transmit a confirmation response to the RRC reconfiguration command via the SCell (e.g., a PUSCH) instead of the PCell. In this case, eNB-2 may deliver the confirmation response to eNB-1 via the BH, etc. Accordingly, in inter-site CA, considerable latency may be caused in an inter-cell (that is, inter-eNB) signaling procedure. Thus, misalignment between the eNB and the UE for CA cell set interpretation may occur and stable/efficient cell resource management and control may not be facilitated.

In order to solve the above-described problems, in an inter-site CA situation or a CA situation similar thereto, configuring of a path in which specific signaling (e.g., RRC, MAC, DCI, UCI) associated with a specific cell may be performed (e.g., a cell or cell group in which a transmission/reception operation for signaling may be performed) is proposed. For example, a path (e.g., a cell or cell group) in which a signal/channel transmission and/or reception operation involved in specific signaling associated with a specific cell may be performed may be configured. In this case, the UE may operate in a state in which the signal/channel involved in specific signaling associated with the specific cell may be transmitted and/or received only through the configured path. For example, the procedure of receiving/detecting/monitoring/decoding and/or transmitting/encoding the signal/channel involved in specific signaling associated with the specific cell is performed only on the configured path and may be omitted on the other paths. In the present invention, the specific cell includes a cell or a cell group. A plurality of aggregated cells may be divided into one or more cell groups. Here, each cell group is composed of one or more cells. For convenience, a cell group, to which a PCell belongs, is referred to as a PCell group and a cell group including SCells only is referred to as an SCell group. The number of PCell groups may be one and the number of SCell groups may be 0 or one or more. In the present specification, unless stated otherwise, the PDCCH may include an L-PDCCH and an E-PDCCH.

A signaling method/path proposed by the present invention is applicable to only an inter-site CA situation or a CA situation similar thereto. That is, the signaling method/path proposed by the present invention is not applied but a conventional signaling/path is applied to an intra-CA situation. Accordingly, an eNB may notify a UE of configuration information of a signaling method/path via an RRC message, etc. Meanwhile, the eNB may consider a CA mode (that is, inter-site CA or intra-site CA) in order to configure the signaling method/path. However, the UE needs to know the applied signaling method/path only. Accordingly, the eNB may not notify the UE of a CA mode but notify the UE of information indicating the signaling method/path applied to the UE only. Since the UE can know the signaling method/path applied thereto from the CA mode, the eNB may not separately notify the UE of the information indicating the signaling method/path.

In the present invention, signaling subjected to path configuration may include the following.

Command/response involved in an RRC configuration/reconfiguration (e.g., SCell allocation/release, per-cell TM configuration, per-cell CSI feedback mode/SRS parameter configuration) procedure RLM (Radio link monitoring) (e.g., radio link failure (RLF)) and RRM measurement (e.g., RSRP, RSRQ) related configuration/report HO (Handover) related command response MAC activation/deactivation (that is, SCell Act/De) message for SCell PHR (Power Headroom Report), BSR (Buffer Status Report), TAC (Timing Advanced Command)

DCI (e.g., DL/UL grant), scheduling request (SR)

Periodic CSI (p-CSI) report, aperiodic CSI (a-CSI) request/report

ACK/NACK (A/N) feedback to DL data reception

RAR (Random Access response), PDCCH for scheduling a PDSCH carrying an RAR (hereinafter, RAR-PDCCH)

As a path configuration example according to signaling, a path for signaling involved in an RRC reconfiguration procedure of additionally allocating/releasing a specific cell to or from a CA cell set and an RRM measurement (e.g., RSRP, RSRQ) report associated with a specific cell may be configured to a PCell group. In this case, signaling involved in an RRC reconfiguration/measurement report associated with a specific cell may be transmitted and received via the PCell group (a PDSCH/PUSCH of an arbitrary cell belonging thereto) only. In addition, a path in which a per-cell PHR for UL power control of a specific cell group (all cells belonging thereto) may be signaled may be configured to the specific cell group. That is, a PHR for a specific cell group may be transmitted via the specific cell group (a PUSCH of an arbitrary cell belonging thereto) only.

A path in which signaling associated with a specific cell in the DC situation is performed may be restricted to CC1 (group) or CC2 (group) according to signaling type. More specifically, in the present invention, a path configuration method according to signaling type includes the following.

Case #1

Signaling type: Command/response involved in an RRC configuration/reconfiguration (e.g., SCell allocation/release, per-cell TM configuration, per-cell CSI feedback mode/SRS parameter configuration) procedure, RLM (e.g., RLF) and RRM measurement (e.g., RSRP, RSRQ) related configuration/report, handover (HO) related command/response Signaling for a specific cell (or a specific cell group): A path may be configured to a PCell group.

Case #2

Signaling type: MAC activation/deactivation message (that is, SCell Act/De) for SCell, PHR, BSR, TAC, DCI (e.g., DL/UL grant), aperiodic CSI (a-CSI) request/report Signaling for a specific cell (or a specific cell group): A path may be configured to a cell group, to which the specific cell belongs, (or the specific cell group). In this case, signaling may be restricted as follows.

A cell list to be activated/deactivated in SCell Act/De may be composed of SCells belonging to the specific cell group only.

A PHR may be composed of a per-cell PHR belonging to the specific cell group only. In addition, an independent PHR transmission period may be configured per cell group.

A BSR may report a UL buffer status of the specific cell group (all cells belonging thereto) only.

A TAC may be composed of per-TAG TACs belonging to the specific cell group only. In addition, cells belonging to different cell groups may not belong to the same TAG.

DCI may be scheduling/control information (e.g., DL/UL grant) of cell(s) belonging to the specific cell group. In addition, cross-CC scheduling may not be allowed between cells belonging to different cell groups (that is, DCI (e.g., DL/UL grant)) for a cell belonging to a specific cell group may be configured not to be transmitted from a cell belonging to another cell group).

An a-CSI request/report may be an a-CSI request/report targeted to cell(s) belonging to the specific cell group. In addition, an a-CSI report target cell set designated via RRC signaling may be independently configured per cell group (that is, an a-CSI report target cell set, to which a-CSI request/report is applied, in a specific cell group may be composed of cell(s) belonging to the specific cell group only). In detail, the number of bits configuring the a-CSI request field in DCI may be independently configured according to the number of cells belonging to the cell group (scheduled from the DCI) (for example, to 1 bit if the number of cells is 1 and to 2 bits if the number of cells is 2 or more). As another method, in order to reduce RRC signaling overhead, the a-CSI request field in DCI (scheduling the SCell group) is fixed to 1 bit with respect to (all or a specific) SCell group, and an a-CSI report only for an individual cell may be performed via a respective cell.

Case #3

Signaling type: ACK/NACK (A/N) for DL data, scheduling request (SR), periodic CSI (p-CSI) report Signaling for a cell belonging to a PCell group: If signaling information is transmitted via a PUCCH, a path may be configured to a PCell. If signaling information is transmitted via a PUSCH (that is, piggybacked on PUSCH (multiplexed with UL data)), a path may be configured to a PCell group (that is a PUSCH transmission cell in a PCell group).

Signaling for a specific SCell belonging to an SCell group: If signaling information is transmitted via a PUCCH, a path may be configured to the specific SCell or a specific SCell designated in the SCell group. (Here, in the designated specific SCell, for example, one of cell(s) configured to perform PDCCH (e.g., DL/UL grant) transmission or (DL/UL data) scheduling in the SCell group is configured (via signaling) or a cell having a specific (for example, smallest) index or specific (e.g., largest) system bandwidth among cell(s) (here, cell(s) in which UL resource/carrier is defined) may be automatically determined). If signaling information is transmitted via a PUSCH (that is, piggybacked on PUSCH (multiplexed with UL data)), a path may be configured to the SCell group, to which the specific SCell belongs. In this case, signaling may be restricted as follows.

A/N transmitted via a PUCCH of an SCell belonging to an SCell group may be composed of an individual A/N response to DL data reception in the SCell only. Unlike the PCell, since SCell activation/deactivation is possible, if the PUCCH is transmitted via a predefined SCell in the SCell group, a predefined SCell may be deactivated when A/N transmission is necessary. Accordingly, (in the case of the SCell group), A/N for the SCell, which has received DL data, may be transmitted via the SCell only. As another method, in order to reduce RRC signaling overhead due to explicit PUCCH resource usage and allocation and increase implicit PUCCH resource usage efficiency, A/N for DL data reception in the specific SCell (belonging to the SCell group) may be defined/set to be transmitted via a cell to which a DL grant PDCCH scheduling the DL data is transmitted.

In addition, A/N piggybacked on a PUSCH of a specific SCell belonging to the SCell group may be composed of an A/N response to DL data reception in all cells of the SCell group.

An SR transmitted via a PUCCH of a specific SCell belonging to the SCell group may be a UL scheduling request targeted to the SCell group (all cells belonging thereto).

p-CSI transmitted via a PUCCH of a specific SCell belonging to the SCell group may be restricted to p-CSI for the specific SCell. In addition, p-CSI piggybacked on the PUSCH of the specific SCell belonging to the SCell group may be composed of p-CSI(s) for one or more cells in the SCell group.

Case #4

Signaling type: RAR, RAR-PDCCH

Signaling for PRACH transmission in a cell belonging to a PCell group: A path of an RAR may be configured to a PCell and a path of an RAR-PDCCH may be configured to a common search space of the PCell.

Signaling for PRACH transmission in a specific SCell belonging to an SCell group: A path of an RAR may be configured to the specific SCell or a specific SCell designated in the SCell group. A path of an RAR-PDCCH may be a common search space of the specific SCell or a specific SCell designated in the SCell group (here, in the case of the designated specific SCell, for example, one of cell(s) configured to perform PDCCH (e.g., DL/UL grant) transmission or (DL/UL data) scheduling in the SCell group is configured (via signaling) or a cell having a specific (for example, smallest) index or specific (e.g., largest) system bandwidth among cell(s) (here, cell(s) in which UL resource/carrier is defined) may be automatically determined).

In the aforementioned case #2, a control channel structure carrying DCI transmitted through a UE specific search space (i.e., USS) (for example, whether to use legacy PDCCH or new type EPDCCH) may be configured independently for each cell group. For example, DCI for PCell group may be transmitted using PDCCH, and DCI for SCell group may be transmitted using EPDCCH. On the contrary, DCI for PCell group may be transmitted using EPDCCH, and DCI for SCell group may be transmitted using PDCCH.

In case of SCell Act/De in the aforementioned case #2, signaling indicating/responding to individual Act/De for each of all SCells allocated to the UE may exceptionally be transmitted and received through the PCell group. To this end, all the SCells which belong to an entire cell group (including SCell which belongs to the PCell group) may be included in a list of target cells related to activation/deactivation within Act/De command transmitted through the PCell group.

Also, signaling indicating/responding to Act/De of each SCell group unit may be transmitted and received through the PCell group. To this end, the list of the SCell group in addition to the list of SCell which belongs to the PCell group may further be included in the list of target cells related to activation/deactivation within Act/De command transmitted through the PCell group. For example, it is assumed that PCell, SCell 1 and SCell 2 are included in the PCell group, SCell 3 and SCell 4 belong to SCell group 1, and SCell 5 belongs to SCell group 2. In this case, the list of target cells related to activation/deactivation within Act/De command transmitted through the PCell group may be comprised of SCell 1, SCell 2, SCell group 1, and SCell group 2.

As another method, signaling indicating/responding to Act/De for a specific Cell (e.g., PSCell) designated to perform PUCCH transmission and/or CSS based scheduling (e.g., RAR) for each SCell group may be transmitted and received through the PCell group. To this end, a list of PSCell in addition to the list of the SCell which belongs to the PCell group may further be included in the list of target cells related to activation/deactivation within Act/De command transmitted through the PCell group.

Meanwhile, if a specific PSCell is deactivated through application of the aforementioned method, deactivation may be applied to the SCell group with which the corresponding PSCell is associated, that is, all the SCell which belong to the SCell group. In this case, application of deactivation includes stop of PDCCH detection for a corresponding cell, stop of DL/UL data transmission and reception through a corresponding cell, deletion of HARQ buffer related to a corresponding cell, stop of CSI reporting for a corresponding cell, and stop of SRS transmission through a corresponding cell.

Figure 13:
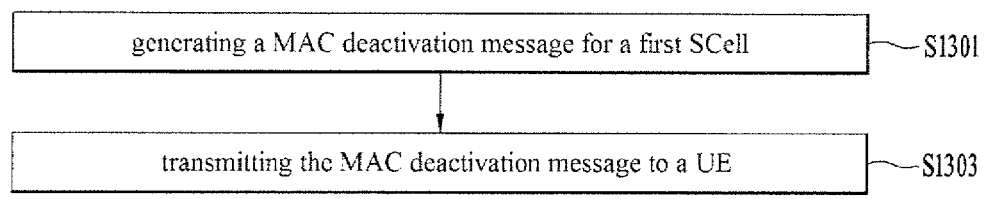
FIG. 13 is a flowchart showing generating and transmitting of a MAC deactivation message.

As an example, consider FIG. 13 which is a flowchart showing generating and transmitting of a MAC deactivation message. In particular, block S1301 shows generating a MAC deactivation message for a first SCell, and block S1303 shows transmitting the MAC deactivation message to a UE.

Meanwhile, the PSCell may be designated as a cell having the greatest system bandwidth (particularly, UL BW) among cells configured to transmit a PDCCH through cross CC scheduling configuration among cells which belong to one SCell group. Alternatively, the PSCell may be designated as a cell having the lowest cell index (e.g., ServCellIndex or SCellIndex).

Also, overlap between CSS and USS, which are configured on the PSCell, may occur. At this time, unlike the PCell (for example, regardless of CIF configuration), a PDCCH candidate (DCI) detected through the corresponding overlapped area may be regarded/construed as a PDCCH candidate (DCI) configured to always correspond to USS. In this case, it is advantageous in that RRC configuration/reconfiguration is performed through PCell or PCell group only to solve unconformity/ambiguity between the UE and the base station, which may occur during the RRC configuration/reconfiguration procedure, and an USS area in the PSCell may be assured/obtained to more and more increase opportunities of using a specific function (for example, aperiodic CSI reporting, aperiodic SRS trigger, etc.) dedicated for the USS.

In this case, overlap between the CSS and the USS may mean that i) payload sizes of DCI formats between PDCCH candidates (DCI) corresponding to/configured for the CSS and the USS are the same as each other, ii) start CCE indexes of the search spaces are the same as each other, and iii) DCI information field types/lengths are configured differently from each other as C-RNTI or SPS C-RNTI based CRC scrambling is applied.

Meanwhile, unlike the aforementioned example, case #1 may be applied to SCell Act/De. In this case, a path where MAC signaling related to activation/deactivation for a specific SCell is performed may be configured to the PCell group.

Meanwhile, an application target of a method for configuring a signaling path in accordance with the present invention is not limited to the aforementioned signaling type. For example, the method for configuring a signaling path in accordance with the present invention may be applied to another signaling related to RRC/MAC/DCI/UCI. For example, case #1 may be applied to signaling related to RRC layer, case #2 may be applied to signaling related to MAC layer, and case #3 may be applied to DCI/UCI related signaling. If a cell group is designated without a separate signaling path configuration procedure, signaling path configurations (case #1, case #2, case #3, and case #4) of the present invention may be applied automatically.

Meanwhile, the cell group may be designated/configured differently depending on signaling or signaling set. That is, cell group designation/configuration independent for signaling or signaling set may be performed. More distinctively, in case of cells having different frame structure types (TDD or FDD), or in case of cells having different CP lengths (normal CP or extended CP), the method for configuring a signaling path as suggested above may be applied in a state that the cells are designated/configured to belong to their respective cell groups different from each other.

Meanwhile, a backhaul link deployed for the purpose of exchange/delivery of (UE related) information/data between cells (sites/eNBs for managing/controlling the same) aggregated for one UE may be composed of non-ideal backhauls having significant latency. If cells (sites/eNBs managing/controlling the same) directly perform exchange/delivery of all information/data via the backhaul link in a non-ideal backhaul based CA situation, significant load/latency may occur on the backhaul link. In order to solve this problem, it is proposed that information exchange/delivery between cells is performed via the UE with respect to a specific/predetermined part of cell information in consideration of load/latency on the backhaul link and a radio channel status of the UE. That is, the backhaul link between cells (sites/eNBs) may be replaced with a radio link between the cell and the UE. More specifically, information exchange/delivery between cells aggregated for the UE may be performed as follows via the radio link. For convenience, it is assumed that cell 1 related information is delivered to cell 2 through the UE in a state that cell 1 (or cell group 1) and cell 2 (or cell group 2) are aggregated for the UE. The cell group 1 is a cell group comprised of one or more cells including cell 1, and is controlled by the base station 1. The cell group 2 is a cell group comprised of one or more cells including cell 2, and is controlled by the base station 2. The UE performs communication with the base station 1 through the cell 1 (or cell group 1), and performs communication with the base station 2 through the cell 2 (or cell group 2). Therefore, although the description of the cell 1, such as information related to the cell 1 or reporting to the cell 1, has been made, the cell 1 may be replaced with the cell group 1. Therefore, the description of the cell 1, that is, information related to the cell 1 or reporting to the cell 1, may be replaced with information related to the cell group 1 or reporting to the cell group 1. Also, since the UE may perform communication with the base station 1 through the cell 1, the description of the cell 1, that is, information related to the cell 1 or reporting to the cell 1, may be replaced with information related to the base station 1 or reporting to the base station 1.

Alt 1: cell 1 command

The cell 1 may command/instruct the UE to deliver/report cell 1-related specific information to the cell 2 (via a specific DL channel/signal transmitted on the cell 1).

The UE may deliver/report the cell 1-related specific information to the cell 2 (via a specific UL channel/signal transmitted on the cell 2) according to the command/instruction of the cell 1.

Alt 2: UE report

The UE may directly deliver/report the cell 1-related specific information to the cell (via a specific UL channel/signal transmitted on the cell 2) at a specific time or at a specific period.

The specific time may be a time when the cell 1-related specific information is reconfigured/changed (or an appropriate time thereafter).

The specific period may be configured via L1/L2/RRC signaling from the cell 1 or the cell 2.

Alt 3: cell 2 request

The cell 2 may request/instruct the UE to deliver/report the cell 1-related specific information to the cell 2 (via a specific DL channel/signal transmitted on the cell 2).

The UE may deliver/report the cell 1-related specific information to the cell 2 (via a specific UL channel/signal transmitted over on cell 2) according to the request/instruction of the cell 2.

Each cell-related specific information which is a target of the aforementioned method for signaling inter-cell information may include TM configured for a corresponding cell, CSI feedback mode, SRS related parameter, activation/deactivation state of a corresponding cell, and TA applied to a corresponding cell. In more detail, in case of Alt 1, the cell 1 may command/instruct the UE to deliver/report SRS related parameter information configured for cell 1 (that is, configured for cell 1 with respect to the corresponding UE) to the cell 2. Therefore, the UE may deliver/report the SRS related parameter information configured for the cell 1 to the cell 2. In case of Alt 2, the UE may directly deliver/report TA information, which is applied to the cell 1, to the cell 2 at the time when TA information (that is, TA information applied to the corresponding UE in the cell 1) applied to the cell 1 is reconfigured/changed (or proper time after the time when TA information is reconfigured/changed). Also, in case of Alt 3, the cell 2 may request/instruct the UE to deliver/report activation/deactivation information (that is, activation/deactivation state information applied to the corresponding cell 1 with respect to the corresponding UE) of the cell 1 to the cell 2. Therefore, the UE may deliver/report the activation/deactivation state information of the cell 1 to the cell 2.

Meanwhile, the aforementioned method (for example, Alt 2 (i.e., UE report) method) may be applied to RLM related information, for example, information as to whether RLF (radio link failure) occurs. That is, as a result of RLM operation with respect to the cell 1, if RLF is declared, the UE may deliver/report the RLF state with respect to the cell 1 to the cell 2. Particularly, the cell 1, which is a target for the RLM operation such as determining whether RLF occurs, may be a PCell, or may be configured as PSCell designated to perform PUCCH transmission or CSS based scheduling (for example, RAR) within the SCell group. Preferably, the cell 1 is configured as PSCell, and the cell 2 is configured as PCell. When the UE detects RLF of the PSCell, the UE may report RLF detection of the PSCell to the PCell or a random cell which belongs to the PCell group (Alt 2 (i.e., UE report) method). On the contrary, if the cell 1 is the PCell, the UE may perform RRC connection recovery through a procedure such as RACH in accordance with a related art procedure (for example, FIG. 8) during RLF detection of the PCell. Hereinafter, the above procedure will be described in more detail with reference to FIG. 11.

Figure 11:
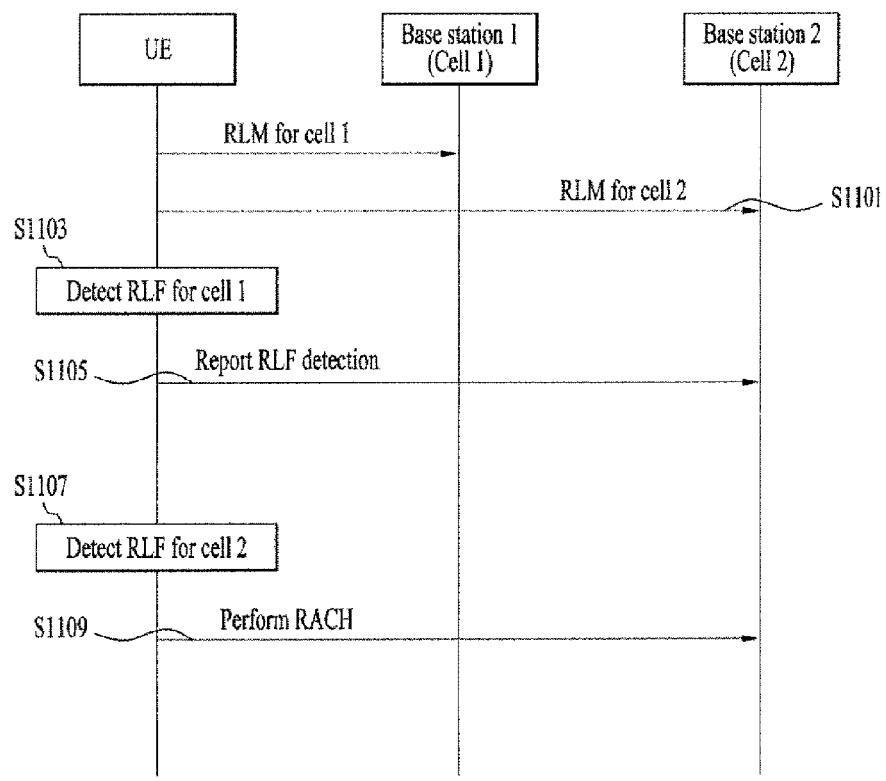
FIG. 11 is a flow chart illustrating a method for detecting RLF in a DC status according to the embodiment of the present invention.

FIG. 11 is a flow chart illustrating a method for detecting RLF in a DC status according to the embodiment of the present invention.

The UE is simultaneously connected to a cell group 1 comprised of one or more cells including cell 1 and a cell group 2 comprised of one or more cells including cell 2. This status is a carrier aggregation status. As described above, if the cell group 1 and the cell group 2 belong to the same base station, it may be regarded as intra-site CA, and if the cell group 1 and the cell group 2 belong to their respective base stations different from each other, it may be regarded as inter-site CA. Hereinafter, inter-site CA (or dual connectivity) status where the cell included in the cell group 1 is controlled by the base station 1 and the cell included in the cell group 2 is controlled by the base station 2 will be described. Also, the cell 1 is a cell representative of the cell group 1, and may be replaced with the cell group 1 or the base station 1. Moreover, the cell 2 is a cell representative of the cell group 2, and may be replaced with the cell group 2 or the base station 2.

According to the related art, in case of intra-site CA where the UE is aggregated for several cells, RLM (Radio Link Monitoring) is performed for the PCell only, whereby there is no problem. However, in case of inter-site CA where several cells are controlled by several base stations, that is, dual connectivity status, RLM is needed to be performed in the SCell in addition to the PCell, whereby a problem may occur. That is, in case of MeNB that controls the PCell is RRC connected for data offload, since the MeNB should know a radio link status of the SCells which are not controlled by the MeNB, the MeNB needs to be reported RLF from the SCells which are not controlled by the MeNB. Hereinafter, a method for enabling a UE to report RLF through RLM of SCell which is not controlled by MeNB will be described.

The UE performs RLM (Radio Link Monitoring) for the cell 1 and the cell 2 (S1101). At this time, as described above, if the radio link status indicates out-of-sync, the UE regards RLF (Radio Link Failure) for the corresponding cell.

The UE may detect RLF differently depending on a type of a cell where RLF is detected. For example, it is assumed that the cell 1 is PSCell of cells which are controlled by a secondary base station that transmits and receives data to and from the UE and the cell 2 is PCell of cells which are controlled by the base station 2 which is a master base station MeNB that performs RRC connection with the UE.

In this case, the PSCell may always be activated, and may be a cell where PUCCH (Physical Uplink Control Channel) transmission may be configured and a contention random access procedure is performed.

If RLF is detected in the cell 1 (S1103), since the RRC_CONNECTED state of the UE is not released, RLF occurs in the PCell, whereas the UE does not need to perform RACH to avoid conversion to the RRC_IDLE state. However, since the cell 1 receives a service of the base station 1, the base station 2 does not know RLF detection of the cell 1, whereby the UE reports RLF detection of the cell 1 to the base station 2 (S1105). In case of the step S1105, if RLF is declared for the cell 1, the UE may report the RLF status of the cell 1 to the base station 1.

Various methods for reporting RLF of the cell 1 from the UE at the step S1105 may be provided. Preferably, one of the various methods may be a non-random access procedure (non-RACH) procedure. The non-random access procedure may be cell ID or cell index reporting of a cell where RLF occurs, or may be RLF cause reporting or RLF reporting. However, the cell ID or cell index reporting, or the RLF cause reporting or RLF reporting is only exemplary, and the present invention is not limited to this reporting.

Meanwhile, if RLF is detected in the cell 2 (S1107), the cell 2 is a PCell which performs RRC connection with the UE, as described above, the UE may perform RACH for the base station 2 to avoid conversion to the RRC_IDLE state (S1109). Identification information or identification (C-RNTI of the UE in a cell where RLF occurs, identity of a physical layer of a corresponding cell, short MAC-I based on security key of a corresponding cell, etc.) of the UE, which is used at the step S1109, may be used to identify whether a stored context belongs to the UE. If the stored context is not matched with the UE, RRC connection is released.

If the cell 1 or the cell 2 is not the PCell or the PSCell, the UE does not report RLF to the base station 1 or the base station 2 even though RLF occurs.

Additionally, as additional step, the UE may receive an indicator indicating which one of a plurality of SCells included in the base station 2 is PSCell from any one of the base station 1 and the base station 2.

Meanwhile, if RLF is declared for a specific PSCell or PCell, a deactivation state may automatically be applied to total cell groups which belongs to the corresponding specific PSCell or PCell, and a CSI measurement operation or RRM measurement (e.g., RSRP/RSRQ calculation) operation may additionally be stopped for all cells which belong to the corresponding cell group.

Meanwhile, semi-static scheduling (for example, SPS) may distinctively be configured for maximum one cell within one cell group for each cell group at the same time. More distinctively, the cell where the corresponding SPS based scheduling may be configured may be the PCell or PSCell.

Figure 12:
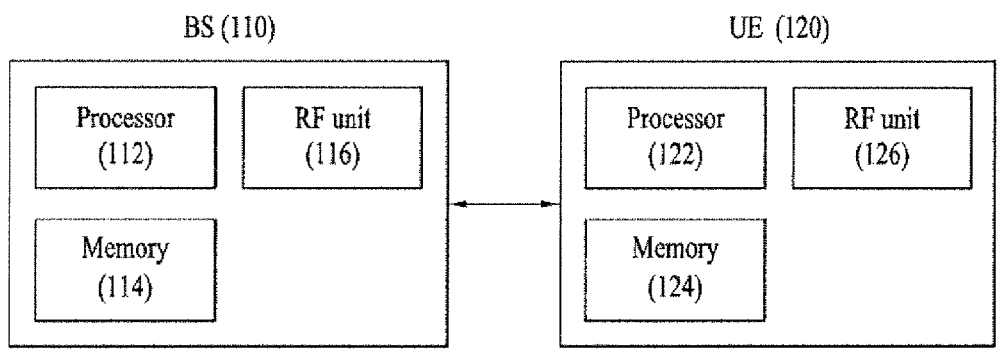
FIG. 12 illustrate a base station and a user equipment, which may be applied to the present invention.

FIG. 12 is a diagram showing a base station (BS) and a user equipment (UE) to which the present invention is applicable.

Referring to FIG. 12, a wireless communication system includes a base station (BS) 110 and a UE 120. The BS 110 includes a processor 112, a memory 114 and a radio frequency (RF) unit 116. The processor 112 may be configured to implement the procedures and/or methods proposed by the present invention. The memory 114 is connected to the processor 112 so as to store a variety of information associated with operation of the processor 112. The RF unit 116 is connected to the processor 112 so as to transmit and/or receive an RF signal. The UE 120 includes a processor 122, a memory 124 and an RF unit 126. The processor 122 may be configured to implement the procedures and/or methods proposed by the present invention. The memory 124 is connected to the processor 122 so as to store a variety of information associated with the operation of the processor 122. The RF unit 126 is connected to the processor 122 so as to transmit and/or receive an RF signal. The BS 110 and/or the UE 120 may have a single antenna or multiple antennas.

The above-described embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. Also, some constituent components and/or characteristics may be combined to implement the embodiments of the present invention. The order of operations disclosed in the embodiments of the present invention may be changed. Some components or characteristics of any embodiment may also be included in other embodiments, or may be replaced with those of the other embodiments as necessary. Moreover, it will be apparent that some claims referring to specific claims may be combined with other claims referring to the other claims other than the specific claims to constitute the embodiment or add new claims by means of amendment after the application is filed.

The above-mentioned embodiments of the present invention are disclosed on the basis of a data communication relationship between a user equipment and a base station. Specific operations to be conducted by the base station in the present invention may also be conducted by an upper node of the base station as necessary. In other words, it will be obvious to those skilled in the art that various operations for enabling the base station to communicate with the user equipment in a network composed of several network nodes including the base station will be conducted by the base station or other network nodes other than the base station. The term "Base Station" may be replaced with the terms fixed station, Node-B, eNode-B (eNB), or access point as necessary. The term "terminal" may also be replaced with the term User Equipment (UE), subscriber station (SS) or mobile subscriber station (MSS) as necessary.

The embodiments of the present invention can be implemented by a variety of means, for example, hardware, firmware, software, or a combination thereof. In the case of implementing the present invention by hardware, the present invention can be implemented through application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in a variety of formats, for example, modules, procedures, functions, etc. Software code may be stored in a memory unit so as to be executed by a processor. The memory unit may be located inside or outside of the processor, so that it can communicate with the aforementioned processor via a variety of well-known parts. It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention is applicable to a wireless communication apparatus such as a UE, a relay and a base station.

What is claimed is:

1. A method for a base station (BS) operating in a wireless communication system, the method comprising:
   generating, by the BS, a Medium Access Control (MAC) deactivation message for a first Secondary Cell (SCell), wherein the first SCell is associated with one or more SCells served by the BS; and
   transmitting, by the BS, the MAC deactivation message to a User Equipment (UE) for deactivating the first SCell,
   wherein the first SCell is used for transmission of HARQ feedback including ACK/NACK information of the one or more SCells associated with the first SCell,
   wherein the MAC deactivation message for the first SCell indicates that all of the one or more SCells associated with the first SCell are deactivated by the UE.

2. The method according to claim 1, further comprising:
   transmitting a Radio Resource Control (RRC) signaling indicating the first SCell among serving cells associated with the BS to the UE.

3. A base station (BS) operating in a wireless communication system, the BS comprising:
   a Radio Frequency (RF) module; and
   a processor configured to control the RF module,
   wherein the processor is configured to:
   generate a Medium Access Control (MAC) deactivation message for a first Secondary Cell (SCell), wherein the first SCell is associated with one or more SCells served by the BS; and
   transmit the MAC deactivation message to a User Equipment (UE) for deactivating the first SCell,
   wherein the first SCell is used for transmission of HARQ feedback including ACK/NACK information of the one or more SCells associated with the first SCell,
   wherein the MAC deactivation message for the first SCell indicates that all of the one or more SCells associated with the first SCell are deactivated by the UE.

4. The BS according to claim 3, wherein the processor is further configured to:
   transmit a Radio Resource Control (RRC) signaling indicating the first SCell among serving cells associated with the BS to the UE.

* * * * *